Sept. 15, 1942.     E. P. BULLARD, 3D     2,295,543
HYDRAULIC MACHINE TOOL MECHANISM
Filed Feb. 16, 1939     2 Sheets—Sheet 2

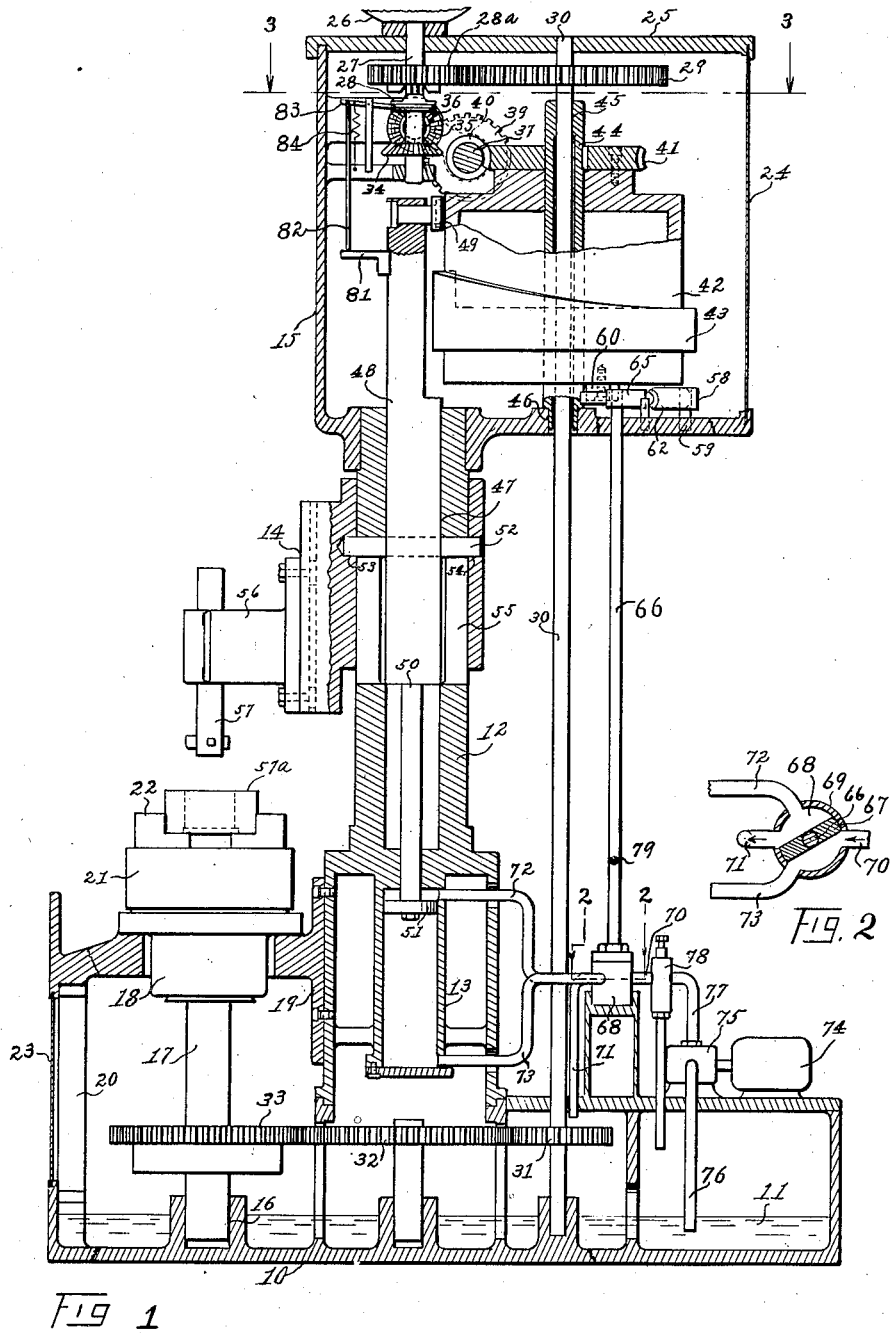

INVENTOR
EDWARD P. BULLARD III
BY
C. M. Newman
ATTORNEY

Patented Sept. 15, 1942

2,295,543

UNITED STATES PATENT OFFICE 2,295,543

HYDRAULIC MACHINE TOOL MECHANISM

Edward P. Bullard, III, Fairfield, Conn., assignor to The Bullard Company, a corporation of Connecticut Application February 16, 1939, Serial No. 256,757

13 Claims. (Cl. 77—4)

The present invention relates to a hydraulic machine tool mechanism particularly adapted to provide for the rapid movement under hydraulic control of a machine tool element, the invention providing for such movement in conjunction with less rapid movement imposed upon the element by other means.

The invention is particularly adapted for use in connection with a machine tool of the lathe or boring mill type and is here illustrated as applied to the feed works construction of such a machine tool.

It is among the primary objects of the invention to provide a new and improved mechanism for providing rapid movement to a machine tool element.

A further object of the invention is to provide a rapid machine tool element drive which is independent of and unaffected by a cooperating slow speed drive for the same element.

A further object of the invention is to provide in a machine tool hydraulic means for rapidly moving one element thereof, which means cooperates with means for more slowly moving the same element.

More specifically it is among the objects of the invention to provide in a machine tool a combination of tool driving mechanisms at least one of which is hydraulic.

Even more specifically is an object of the invention to provide in a lathe type of machine tool a tool feeding drive mechanism cooperating with a hydraulic mechanism for rapidly driving the tool.

Another object of this invention is to provide hydraulic means adapted to hold a cam roll against a feed cam during the feed stroke and to hydraulically remove the cam roll from the cam at the end of the feed stroke. Still another object is to provide means independent of the cam to control the tool slide during the traverse stroke to and from the work.

Numerous other objects and features of the invention will be apparent from a consideration of the specification in conjunction with the accompanying drawings in which:

Figure 1 is a side elevation partly in section of a single spindle vertical machine tool provided with a single slide embodying the principles of the invention.

Figure 2 is an enlarged plan view of a section through the control valve taken on line 2—2 of Figure 1.

Figure 3:
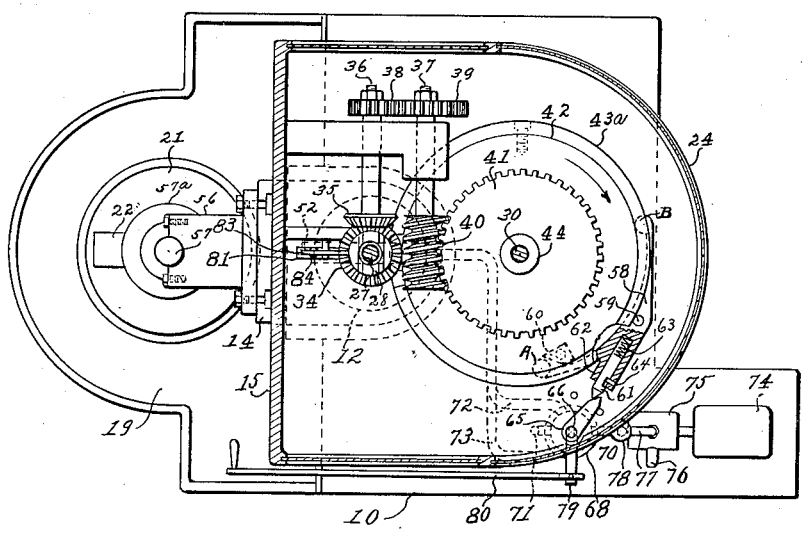
Figure 3 is a horizontal section taken on line 3—3 of Figure 1 disclosing the automatic and hand control of the valve shown on Figures 1 and 2.

While the invention is here disclosed as providing for a rapid traverse movement for the tool holding head which is fed during its cutting stroke by cam and hydraulic means, it is obvious that the invention is not restricted to this particular application. The auxiliary hydraulic drive may be applied to the feeding movement while cam or other means may provide the traverse movement or the hydraulic drive may be used in part for feeding motion while other means provide a different rate of feed movement.

It is also apparent that the invention is not restricted to application to a tool head since other elements of the machine tool may be provided with the auxiliary drive here disclosed, and finally, it is of course evident that the invention is in no way limited to the type of machine tool here disclosed since it is obviously applicable to machine tools other than lathes and machine tools having multiple spindles and/or multiple tool heads.

In that form of the invention here disclosed by way of illustration, a movable machine tool element, here shown as a tool slide, is associated with a hydraulic cylinder in such manner as to provide for rectilinear movement of the slide in either direction in response to fluid under pressure in a cylinder. The slide is also provided with cooperating means to control its motion, the arrangement being such that the hydraulic mechanism may act to remove the slide in such manner as to disengage it from the cooperating control mechanism and move it rapidly in forward or reverse direction independent of the cooperating mechanism.

In machine tools, and particularly those utilizing cam means for operating the tool head, there is frequently a considerable loss of time due to the necessary movement of the tool head towards and away from the work. Such movement is commonly termed the traverse movement of the tool head and due to limitations of the angle of a cam which may be utilized for rapidly traversing the tool, such traverse movement of the tool by the cam has definite limitations as to its speed.

The present invention seeks to overcome these limitations, by providing hydraulic means which may be operated to remove the tool operating slide rapidly from its feed driving mechanism, in order to accomplish the traverse movement independent of the feed driving mechanism.

Referring to the construction shown in Figure 1, the machine rests upon a hollow base 10, which provides a reservoir 11 for the hydraulic fluid and a support for an upwardly disposed hollow column 12.

The column 12 is characterized by a lower section providing a support for a cylinder 13, an intermediate portion providing a bearing for an encircling tool slide 14 and a top section for the mounting of a superstructure 15 enclosing the feed works. The base section 10 also provides a lower bearing 16 for a spindle 17 for rotation therein. An upper bearing 18 for the spindle 17 is enclosed in a frame 19, the inner portion of which is secured to the column 12 and the outer portion resting upon standards 20, one of which is shown. The spindle 17 may be provided with a suitable chuck 21 and work retaining jaws 22. Sliding panels 23 enclose the front of the machine and permit access to the mechanism in the base.

The superstructure 15 mounted upon the top of the column is partially enclosed by similar sliding panels 24. On a top platform 25 of the superstructure 15 may be mounted a motor 26 (a portion being disclosed) for operating certain parts of the machine continuously and other parts intermittently through a clutch element. That portion of the machine which requires intermittent operation, such as the work holding spindle, is operated from the motor 26 through a shaft 27 extending downward through a clutch element 28 splined thereto. The clutch element 28, when in clutched engagement with a clutch gear 28a, loosely mounted upon the shaft 27, drives a gear 29 secured to a shaft 30. The shaft 30 extends from the top platform 25 of the superstructure 15 to the base 10. A gear 31, keyed to the lower end of the shaft 30, meshes with an idle gear 32 which in turn meshes with a spindle driving gear 33, keyed to the spindle 17, establishing driving connections between the motor 26 and the spindle 17. That portion of the machine which is continuously driven, such as the control drum unit, derives its power also from the shaft 27 which is connected with and drives a bevel gear 34 meshing with a similar bevel gear 35 on a horizontal shaft 36 (Figure 3) and adapted to drive a secondary shaft 37 through gears 38 and 39. Gears 38 and 39 are mounted upon ends of their respective shafts 36 and 37 and may be referred to as pick-off gears which may be replaced by other gear sets providing a different ratio of speeds between the shafts 36 and 37. Secured to the shaft 37 is a worm 40 meshing with a worm gear 41 attached to a cam drum 42 provided with a circular cam ring 43.

The pick-off gears referred to provide a means to change the relative speed of rotation of the cam drum 42 and the spindle 17. Both the worm gear 41 and the drum 42 are mounted on a hollow sleeve 44 for rotation therewith. The sleeve 44 encircles the upper end of the shaft 30 and is provided with an upper bearing section 45 closely fitting the shaft 30 and a lower bearing section 46 journaled in the superstructure 15.

The intermediate portion of the column 12 provides a bearing 47 for a plunger 48, mounted for reciprocation axially therein. The upper end of the plunger is provided with a cam roll 49 aligned to roll on the circular cam ring 43 which is secured to the drum 42. The lower portion of the plunger 48 is of reduced diameter and forms a piston rod 50 which is attached to a piston 51 reciprocating in the cylinder 13. The construction being such that any movement of the piston 51 will cause a corresponding movement to the plunger 48 and the cam roll 49.

Passing through the midsection of the plunger 48 is a stroke limiting bar 52 of sufficient length to extend beyond the circumference of the column 12. The outer ends of the bar 52 enter recesses 53 and 54 in the tool slide 14, locking the slide to the plunger for movement therewith.

The bar 52 reciprocates in oppositely disposed longitudinally extending slots 55 in the column 12 and transmits any motion of the plunger 48 to the tool slide 14. The upper end of the slots limiting the upward movement of the plunger. Secured to the tool slide 14 is a tool holder 56 holding a tool 57 suitable to a work-piece 57a in the chuck 21.

Housed in the lower portion of the superstructure is the control mechanism which consists, in the simplified form illustrated, of an arcuate lever 58 fulcrumed on a pin 59 and provided with enlarged ends A and B (Figure 3). The lever 58 is so positioned with respect to a block 60 attached to the under side of the drum 42 that upon rotation of the drum, the lever 58 will be rocked as the block 60 passes the ends A and B. An arrowhead 61, housed in an arm 62 of the lever 58, is urged outward by a spring 63. A pin 64 limits the outward motion of the arrowhead but allows the point to pass the beveled end of an adjacent lever 65 mounted on the upper end of a valve operating rod 66. The lower end of the valve rod 66 carries a gate 67 (Figure 2) located in a valve body, generally indicated by number 68, positioned on a rear portion of the base 10, and as diagrammatically illustrated in Figure 2, the valve body comprises a casing 69 embracing the gate 67 rotatably mounted therein. A pressure delivery pipe 70 and an exhaust pipe 71 are aligned on opposite sides of the casing. Two pipes 72 and 73 are so joined to the casing that a partial rotation of the gate 67 will direct the flow of fluid from the pressure delivery pipe 70 through either one of the pipes 72 and 73 communicating to opposite ends of the cylinder 13. Exhaust fluid from the cylinder 13 may pass through either of the pipes 72 and 73 and through the exhaust pipe 71 to the reservoir 11 in the base. The connection of either of the pipes 72 and 73 with the exhaust pipe 71 depending upon the position of the gate 67 in the casing 69.

Fluid under pressure for the hydraulic operation of the piston 51 in the cylinder 13 is provided for by a motor 74 connected to drive a fluid pressure pump 75. The pump 75 drawing fluid through a pipe 76 from the reservoir 11 in the base forces the fluid through a pipe 77, through a relief valve 78 and the pipe 79 to the valve body 68 thence to the cylinder 13 by way of pipes 72 or 73 depending upon the position of the valve gate 67 in the casing 69. The exhaust fluid from the cylinder returning to the valve body 68 by either pipe 72 or 73 and emptying into the reservoir through the pipe 71. For controlling the valve gate 67 manually a lever 79 is attached to the valve rod 66. Means may be provided, such as an operating rod 80 extending from the lever 79 to the front of the machine, whereby an operator may by a push or pull movement of the rod 80, operate the gate 67.

In order that the chuck 21 will cease to operate after the tool 57 leaves the work piece 57a to allow for unloading and loading a new work piece, means are provided to disengage the clutch 28 as the plunger nears the uppermost position. This means includes a dog 81 attached to the upper portion of the plunger 48 and as the plunger 48 nears the uppermost position of its stroke, the dog 81 strikes a trip rod 82 attached to one end of a clutch operating lever 83. The arrangement being such that the clutch operating lever will move the clutch element 28, against the tension of a spring 84 axially on the shaft 27, thereby separating the clutch element 28 from the clutch gear 28a. The gear 28a being no longer under the influence of the driving motor 26, the gear train 29, 31, 32, 33 and the spindle 17 formerly driven thereby will come to rest.

Figure 4:
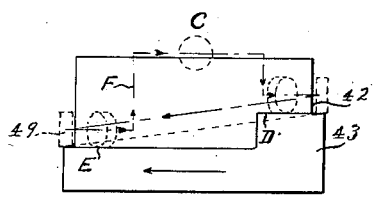
Figure 4 is a diagrammatic elevation of the cam drum with its associated cam showing the path taken by the cam roll during one revolution of the drum.

In order that the working of the machine may be understood, the cycle of operation will be described. The relative position of the elements of the machine, as shown in Figure 1, discloses the tool slide and the plunger 48 at the uppermost position. As shown in Figure 4 the roll 49 would be in the position C. The tool 57 is sufficiently removed from the chuck 21 to allow the operator to secure a work piece 57a in the jaws 22. It is assumed the pump motor 74 is functioning and the main driving motor 26 is operating and rotating the drum 42 through the bevel gears 34 and 35, shafts 36 and 37, pick-off gears 38 and 39, worm 40 and worm gear 41, as previously described. Rotation of the drum 42 will move the block 60 attached to the drum 42 against the end A of the lever 58, rocking the lever, urging the arrowpoint 61 over the point of the lever 65, forcing the lever to its extreme position in one direction and producing a partial rotation of the rod 66 and the valve gate 67 attached thereto.

Under the influence of the pump 75, fluid will now pass through the pipe 77, relief valve 78, pipe 70, valve body 68 and the pipe 72 to the cylinder 13, forcing the piston 51 and the plunger 48 downward. The fluid below the piston 51 leaving the cylinder by the pipe 73, passing through the valve body 68 and discharging through the pipe 71 to the reservoir in the base. The downward movement of the plunger will continue until interrupted by the contact of the cam roll 49 with the cam 43. As shown in Figure 4, the roll 49 meets the high section of the cam at the position D. The downward movement of the plunger 48 has also lowered the trip dog 81 attached thereto, permitting the spring 84 to engage the clutch element 28 with the clutch on the rotating gear 28a, transmitting rotation to the gear 29 and the shaft 30.

The shaft 30, extending downward to the base of the machine, translates its rotation through the gear train 31, 32, and 33 to the spindle 17, causing rotation of the chuck 21 and the work piece 57a. The downward movement of the plunger so far has been a rapid one and is known as the traverse movement of the tool in approaching the work. The continued downward movement of the plunger 48 and the attached tool slide will now feed the tool 57 slowly for work operation. The movement being controlled by the roll 49 in contact with the inclined surface of the revolving cam ring 43 on the drum 42. As shown in Figure 4 the roll 49 moves to the position E on the lower portion of the cam. The slow work operation movement will continue until the block 60 on the revolving drum 42 comes in contact with the end B, of the lever 58, throwing the arrowhead 61 to the opposite side of the lever 65, forcing the lever to its extreme position in the opposite direction, causing a partial rotation of the valve rod 66 and the gate 67 in the valve body 68, reversing the fluid pressure in the cylinder 13 to the lower side of the piston 51 and allowing fluid above the piston to exhaust by means of the pipe 72 through the valve body 68 and the pipe 71 to the reservoir.

The pressure upon the lower side of the piston 51 forces the plunger upward. The upward or rapid traverse movement of the plunger and the tool slide will continue until the bar 52, passing through the plunger 48, reaches the upper end of the slot 55 in the column 12. The rapid upward movement of the roll 49 is shown by the direction line F in Figure 4. As the plunger rises, the dog 81 strikes the rod 82, lifting the lever 83 against the tension of the spring 84, disengaging the clutch 28 from the clutch gear 28a, causing the chuck 21 to become idle, permitting the removal of the work piece 57a and its replacement with a new work piece. The continuously revolving cam drum 42 will rotate the block 60 past the end A of the lever 58 and commence another downward traverse stroke. The elements of the machine have now returned to their original positions completing a cycle of operation.

It is to be understood that throughout the description of the structure and its operation numerous changes and modifications, and the full use of equivalents may be resorted to without departing from the spirit and scope of the invention as outlined in the claims.

What I claim is:

1. In a machine tool, a rotatable work spindle, means for rotating said spindle, a column, a plunger, reciprocably mounted within said column, a tool carrier reciprocably mounted on the outside of said column, means connecting the plunger to the carrier, said means including oppositely disposed longitudinal slots in said column, a pin reciprocably mounted in said longitudinal slots and secured to said tool carrier and said plunger, hydraulic means for moving the plunger and carrier relative to work on the spindle comprising a cylinder aligned with said plunger, a piston therein operatively connected with said plunger, and fluid pressure means including a control valve to change the flow of fluid to opposite sides of the piston.

2. In a machine tool, a rotatable work spindle, means for intermittently rotating said spindle, a column, a plunger reciprocably mounted within said column, said plunger provided at one end with a piston and at the other end with a roll positioned to engage the surface of a cam ring, said cam ring being adapted to be revolved proportionately with said spindle, a cylinder within said column, said piston being adapted to be reciprocated in said cylinder, a tool carrier reciprocably mounted on said column, means connecting the plunger to the carrier, fluid means connected to both sides of said piston, automatic mechanical means associated with said cam ring to change the flow of fluid from one side of the piston to the other to cause the plunger to reciprocate, part of the motion of said carrier in one direction being controlled by said roll coming in contact with said rotating cam ring and means to maintain said fluid means at a predetermined pressure.

3. In a machine tool, a rotatable work spindle, means for intermittently rotating said spindle, a column, a plunger reciprocably mounted within said column, said plunger provided at one end with a piston and at the other end with a roll positioned to engage a cam integral with a cam drum, a cylinder in said column, said piston reciprocating in said cylinder, a tool carrier reciprocably mounted on said column, means connecting the plunger to the carrier, means for rotating the cam drum and hydraulic means associated with said piston comprising a mechanically operated control valve associated with said piston comprising a mechanically operated control valve associated with said drum for moving the plunger and carrier relative to the work on the spindle, said movement being relatively rapid when the roll is moved toward and from the cam and relatively slow when the roll is in contact with the cam.

4. As an improvement in machine tools, a rotatable work carrier, means for intermittently rotating said work carrier, a column, a plunger reciprocably mounted within said column, said plunger provided at one end with a piston and at the other end with a roll, a cam adapted to cooperate with said roll, a cylinder within said column, said piston reciprocating in said cylinder, a tool carrier reciprocably mounted on said column and adapted to move a tool at variable speeds with respect to work on said work carrier, said tool carrier and plunger being operatively connected to reciprocate together, means adapted to continuously rotate said cam, and hydraulic means associated with said cylinder and comprising a mechanically operated control valve associated with said cam, the construction and arrangement being adapted to rapidly move said roll toward said cam, resiliently hold said roll against said cam and rapidly move said roll away from said cam.

5. A machine tool comprising in combination, a work-supporting means; a tool-supporting means; means for moving one of said supporting means toward and away from the other supporting means; cam means adapted to cooperate with said moving means for restricting to a predetermined fixed rate at least a portion of the movement of said one supporting means in one direction relatively to said other supporting means, while permitting unrestricted movement of said one supporting means in the other direction relatively to said other supporting means; means for providing continuous relative rotation between said cam means and said tool supporting means while successive pieces of work are machined; and means operative at predetermined intervals during said relative rotation for rendering said moving means effective to move said one supporting means toward and away from the other supporting means in accordance with a predetermined order.

6. A machine tool as claimed in claim 5, in which means is provided for rotating one of said supporting means; and said restricting means controls at least a portion of the movement of one of said supporting means in one direction relative to the other supporting means at a rate definitely related to the rate of rotation of said rotatable supporting means.

7. A machine tool as claimed in claim 5, in which means is provided for rotating said work-supporting means; and said restricting means controls at least a portion of the movement of said tool-supporting means in one direction relatively to the work-supporting means at a rate definitely related to the rate of rotation of said work-supporting means.

8. A machine tool comprising in combination, a work-supporting table; a tool support adapted to be moved toward and away from said table; fluid-operated means for moving said tool support toward and away from said table; cam means adapted to cooperate with said fluid-operated means for restricting to a predetermined rate the movement of said tool support in one direction relatively to said work-supporting table, while permitting unrestricted movement of said tool support in the other direction relatively to said work-supporting table; means for providing continuous relative rotation between said cam means and said tool-supporting means while successive pieces of work are machined; and means for selectively rendering said fluid-operated means effective at predetermined intervals during said relative rotation to move said tool support toward and away from said table in accordance with a predetermined order.

9. A machine tool comprising in combination, a work-supporting table; a tool support; means for rotating said table; fluid-operated means for moving said tool support toward and away from said table; cam means adapted to cooperate with said fluid-operated means for restricting to a predetermined rate at least a portion of the movement of said tool support in a definite relation with respect to the rotation of said table; means for providing continuous relative rotation between said cam means and said tool-supporting means while successive pieces of work are machined; and means for selectively rendering said fluid-operated means effective at predetermined intervals during said relative rotation to move said tool support toward and away from said table in accordance with a predetermined order.

10. A machine tool comprising in combination, a work-supporting means; means for driving said work-supporting means; a tool-supporting means; means for moving one of said supporting means toward and away from the other supporting means; cam means adapted to cooperate with said moving means for restricting to a predetermined fixed rate at least a portion of the movement of said one supporting means in one direction relatively to said other supporting means, while permitting unrestricted movement of said one supporting means in the other direction relatively to said other supporting means; means for providing continuous relative rotation between said cam means and said tool-supporting means while successive pieces of work are machined; and means operative at predetermined intervals during said relative rotation for rendering said moving means effective to move said one supporting means toward and away from the other supporting means, and for dis-engaging and engaging said work-supporting driving means.

11. A machine tool comprising in combination, a work-supporting table; a tool support adapted to be moved toward and away from said table; fluid-operated means for moving said tool support toward and away from said table; cam means adapted to cooperate with said fluid-operated means for restricting to a predetermined rate the movement of said tool support in one direction relatively to said work-supporting table, while permitting unrestricted movement of said tool support in the other direction relatively to said work-supporting table; means for providing continuous relative rotation between said cam means and said tool-supporting means while successive pieces of work are machined; and means for selectively rendering said fluid-operated means effective at pre-determined intervals during said relative rotation to move said tool support toward and away from said table, and for dis-engaging and engaging said work-supporting driving means.

12. A machine tool comprising in combination, a work-supporting means; a tool-supporting means; means for moving one of said supporting means toward and away from said other supporting means; control means adapted to cooperate with said moving means for restricting to a predetermined fixed rate at least a portion of the movement of said one supporting means in one direction relatively to said other supporting means, while permitting unrestricted movement of said one supporting means in the other direction relatively to said other supporting means; means for providing continuous relative movement between said control means and said tool-supporting means while successive pieces of work are machined; and means operable at predetermined intervals during the relative movement between said control means and said tool-supporting means for rendering effective the means for moving said one supporting means toward and away from the other supporting means.

13. A machine tool comprising in combination, a work-supporting means; means for driving said work-supporting means; a tool-supporting means; means for moving one of said supporting means toward and away from the other supporting means; control means adapted to cooperate with said moving means for restricting to a predetermined fixed rate at least a portion of the movement of said one supporting means in one direction relatively to said other supporting means, while permitting unrestricted movement of said one supporting means in the other direction relatively to said other supporting means; and means operated by said control means for rendering said moving means effective to move said one supporting means toward and away from the other supporting means, and for disengaging and engaging said work-supporting driving means.

EDWARD P. BULLARD, III.

CERTIFICATE OF CORRECTION.

Patent No. 2,295,543. September 15, 1942.
EDWARD P. BULLARD, III.

It is hereby certified that error appears in the printed specification of the above numbered patent requiring correction as follows: Page 3, second column, line 36, claim 1, strike out the comma after "plunger"; page 4, first column, lines 8 to 10, claim 3, strike out "associated with said piston comprising a mechanically operated control valve"; and that the said Letters Patent should be read with this correction therein that the same may conform to the record of the case in the Patent Office.

Signed and sealed this 3rd day of November, A. D. 1942.

(Seal)

Henry Van Arsdale,
Acting Commissioner of Patents.